(12) United States Patent
Lee et al.

(10) Patent No.: US 6,830,849 B2
(45) Date of Patent: Dec. 14, 2004

(54) HIGH CRYSTALLINE POLYPROPYLENE MICROPOROUS MEMBRANE, MULTI-COMPONENT MICROPOROUS MEMBRANE AND METHODS FOR PREPARING THE SAME

(75) Inventors: Sang-Young Lee, Taejeon (KR); Byeong-In Ahn, Taejeon (KR); Sung-Gap Im, Taejeon (KR); Soon-Yong Park, Taejeon (KR); Heon-Sik Song, Taejeon (KR); You-Jin Kyung, Seoul (KR)

(73) Assignee: LG Chemical Co., Ltd., Seoul (KR)

( * ) Notice: Subject to any disclaimer, the term of this patent is extended or adjusted under 35 U.S.C. 154(b) by 375 days.

(21) Appl. No.: 09/936,007

(22) PCT Filed: Jan. 10, 2001

(86) PCT No.: PCT/KR01/00037

§ 371 (c)(1),
(2), (4) Date: Sep. 7, 2001

(87) PCT Pub. No.: WO01/51171

PCT Pub. Date: Jul. 19, 2001

(65) Prior Publication Data

US 2003/0031924 A1 Feb. 13, 2003

(30) Foreign Application Priority Data

Jan. 10, 2000 (KR) .............................. 2000-892
Apr. 17, 2000 (KR) ....................... 2000-20101

(51) Int. Cl.$^7$ ................................. H01M 2/16
(52) U.S. Cl. .................... 429/249; 429/247; 429/231.9; 429/231.95; 204/296; 521/27
(58) Field of Search .................. 429/231.9, 231.95, 429/247, 249; 521/27; 204/296

(56) References Cited

U.S. PATENT DOCUMENTS

| | | | |
|---|---|---|---|
| 3,679,538 A | 7/1972 | Druin et al. ................. 161/159 |
| 3,801,692 A | * 4/1974 | Zimmerman ................. 264/154 |
| 3,843,761 A | 10/1974 | Bierenbaum et al. ... 264/210 R |
| 4,238,459 A | 12/1980 | Phillips, Jr. et al. ......... 423/167 |
| 4,874,567 A | 10/1989 | Lopatin et al. ............. 264/45.1 |
| 5,013,439 A | 5/1991 | Fisher et al. ........... 210/500.23 |
| 5,240,655 A | 8/1993 | Troffkin et al. ................ 264/28 |
| 5,342,695 A | 8/1994 | Tsurutani et al. ............ 428/516 |
| 5,385,777 A | 1/1995 | Higuchi et al. .......... 428/316.6 |
| 5,472,792 A | 12/1995 | Tsurutani et al. ............ 428/516 |
| 5,480,745 A | 1/1996 | Nishiyama et al. ......... 429/242 |
| 6,232,402 B1 | * 5/2001 | Demeuse .................... 525/191 |

FOREIGN PATENT DOCUMENTS

| | | |
|---|---|---|
| EP | 0 715 364 A1 | 6/1996 |
| EP | 0 718 901 A1 | 6/1996 |
| EP | 0 723 304 A2 | 7/1996 |
| JP | 04-181651 | 6/1992 |
| WO | 97/11097 | 3/1997 |

* cited by examiner

Primary Examiner—Bruce F. Bell
(74) Attorney, Agent, or Firm—Ladas & Parry

(57) ABSTRACT

The present invention relates to a high crystalline polypropylene microporous membrane and a preparation method of the same, and it provides a preparation method of a polypropylene microporous membrane comprising the steps of preparing a precursor film using high crystalline polypropylene having a crystallinity of 50% or more and a very high isotacticity, annealing, stretching at a low temperature, stretching at a high temperature, and heat setting, and a polypropylene microporous membrane having superior permeability and mechanical properties prepared by the preparation method.

26 Claims, 2 Drawing Sheets

HIGH CRYSTALLINE POLYPROPYLENE MICROPOROUS MEMBRANE, MULTI-COMPONENT MICROPOROUS MEMBRANE AND METHODS FOR PREPARING THE SAME

CROSS REFERENCE TO RELATED APPLICATION

This application is based on application No. 10-2000-0000892 and No. 10-2000-0020101 filed in the Korean Industrial Property Office on Jan. 10, 2000 and Apr. 17, 2000 respectively, the contents of which are incorporated hereinto by reference.

BACKGROUND OF THE INVENTION (a) Field of the Invention

The present invention relates to a high crystalline polypropylene microporous membrane and a preparation method of the same, and more particularly to a high crystalline polypropylene microporous membrane which is prepared through the steps comprising preparing a precursor film using high crystalline polypropylene having a 50% or more crystallinity and a very high isotacticity, annealing, stretching at a low temperature, stretching at a high temperature, and heat setting, and a preparation method of the same.

Furthermore, the present invention relates to a multi-component micro-porous membrane and a preparation method of the same, and more particularly to a microporous membrane comprising two or more synthetic resin components, different from a conventional microporous membrane comprising one component of polypropylene, and a preparation method of the same.

(b) Description of the Related Art

A microporous membrane is being widely used in various fields such as filter membranes in air purification, water treatment, etc., separators in electrolysis, batteries, etc., gas exchange membranes, artificial internal organs, beverage purification, enzyme refining, etc. The importance of a microporous membrane as a separator in batteries, particularly in lithium ion batteries, is increasing.

A separator for batteries, particularly a separator for lithium ion batteries among the applications, is described in the following.

As separators for batteries, these membranes play a role that isolates an anode from a cathode, and thereby prevent short circuits due to melting contacts between two electric poles, and at the same time passing electrolyte or ions. Although varieties of separators are being used depending on the type of batteries, chemical materials of electrolytes, etc., various studies on separators for lithium ion batteries are recently being pursued since separators for lithium ion batteries require different characteristics than separators used in conventional batteries. Although there are cellulose, nonwoven fabric, etc. as general separator materials used in conventional batteries, a novel microporous separator using synthetic resin materials has been developed since it is difficult for conventional separator materials to satisfy aforementioned characteristics required in batteries.

There are many cases in which polyolefin based resin having a low reactivity with an organic solvent and a low manufacturing cost is used as a material for separators because highly active organic solvents are used as electrolyte in lithium ion batteries. However, there are no materials apart from polyolefin resin which have practically been used up to now as separators for lithium ion batteries.

Although methods for preparing a precursor film by using polyolefin based resin include many processes which can be used theoretically or in laboratories, methods for preparing a microporous membrane used as a separator which is now commercially available can largely be divided into a wet process, in which filler or wax, and solvent are used, and a dry process in which solvents are not used. Furthermore, the stretching process related with forming of microscopic pores from these methods frequently employs mono-axial stretching and double-axial stretching methods.

A dry process can prepare a wider width of precursor film above all, has a relatively easier production process than a wet process, and does not use solvents, thereby having merits of a superior manufacturing environment and easier mass production.

A preparation method of a microporous membrane using a dry process includes the continuous cold stretching and hot stretching processes as disclosed in U.S. Pat. Nos. 3,679,538 and 3,801,692, etc. Generally, these processes include a series of processes in which membrane formation is completed by heat setting after forming micropores on the film by passing a precursor film having a high crystallinity and elasticity through a cold stretching process and then continuously stretching the film at a high temperature. Particular technologies on the continuous cold stretching and high temperature stretching processes are disclosed in U.S. Pat. Nos. 3,843,761 and 4,238,459. The disclosed technologies include methods in which the annealed precursor film is initially cold stretched and then multi-step high temperature stretched. Furthermore, it is disclosed in U.S. Pat. No. 5,013,439 that a membrane of which pore size is decreased and pore density is increased can be prepared using a multi-step cold stretching process in the continuous cold stretching and high temperature stretching processes. It is disclosed in U.S. Pat. Nos. 5,385,777 and 5,480,745 that a microporous membrane is prepared through the aforementioned continuous multi-step cold stretching and high temperature stretching processes using a blend of polyethylene and polypropylene in order to improve safety of lithium ion batteries.

Furthermore, a preparation method of a separator for lithium ion batteries by laminating polyethylene and polypropylene using a dry process is disclosed in European Patent Publication Nos. 715,364, 718,901 and 723,304, U.S. Pat. Nos. 5,240,655, 5,342,695 and 5,472,792, Japanese Patent Laid-open Publication No. Heisei 4-181651, etc. As descried in the above, relatively weak amorphous regions are ruptured through cold stretching thereby forming pores in a dry process in which these separating membranes of crystalline polymer are prepared, and a separating membrane prepared by this process has problems in that porosity is not sufficiently improved since porosity and pore size of the membrane are somewhat decreased. It is also difficult to uniformly control pore size and appearance of the membrane, and there is a limit in increasing the stretching ratio for maintaining a form of the separating membrane, even though only pure polymer is used in the manufacturing process because of the merits of a clean process in which problems such as solvent contamination, etc. do not exist at all. Furthermore, mechanical properties such as toughness are somewhat low due to anisotropy of stretching in the dry process.

Furthermore, a general polypropylene separator is prepared using stretching without solvents in a dry process, wherein a high permeability and desired mechanical properties together cannot be expected due to characteristics of polypropylene itself and the preparation method, since permeability and desired mechanical properties of the membrane generally tend to show inverse proportionality.

SUMMARY OF THE INVENTION

Therefore, it is an object of the present invention, considering problems of the conventional technologies, to provide a microporous membrane of high crystalline polypropylene having uniform pore size distribution, high pore density, and porosity.

It is other object of the present invention to provide a method for preparing a microporous membrane having uniform pore size distribution, high pore density, and porosity comprising the steps of preparing a precursor film using high crystalline polypropylene, annealing, low temperature stretching, high temperature stretching, and heat setting.

It is another object of the present invention to provide a separator for batteries, particularly a separator for lithium ion, or more particularly a separator for lithium ion polymer batteries having superior permeability characteristics and mechanical properties using the prepared microporous membrane.

It is another object of the present invention to provide a microporous membrane having a matrix of polypropylene prepared by stretching without using solvents, wherein both permeability and mechanical properties of the membrane are improved, and a method for preparing the same.

In order to accomplish the objects, the present invention provides a high crystalline polypropylene microporous membrane satisfying one or more physical properties selected from the group consisting of a crystallinity of 50% or more, isotacticity (pentad fraction) of 95% or more, an atatic fraction of less than 5%, a density of 0.905 g/cm$^3$ or more, a melting temperature of 164° C. or more, and a crystallization temperature of 125° C. or more.

Furthermore, the present invention provides a preparation method of a microporous membrane comprising the steps of:
a) preparing a high crystalline polypropylene precursor film
satisfying one or more physical properties selected from the group
consisting of crystallinity of 50% or more, isotacticity (pentad fraction)
of 95% or more, less than 5% of an atatic fraction, a density of 0.905
g/cm$^3$ or more, a melting temperature of 164° C. or more, and a crystallization temperature of 125° C. or more;
b) annealing the precursor film;
c) stretching the annealed precursor film at a low temperature;
d) stretching the low temperature stretched film at a high temperature; and
e) heat setting the high temperature stretched film.

Furthermore, the present invention provides a high crystalline polypropylene lithium ion battery separator satisfying one or more physical properties selected from the group consisting of crystallinity of 50% or more, isotacticity (pentad traction) of 95% or more, an atatic fraction of less than 5%, a density of 0.905 g/cm$^3$ or more, a melting temperature of 164° C. or more, and a crystallization temperature of 125° C. or more.

Furthermore, the present invention provides a high crystalline polypropylene lithium ion polymer battery separator satisfying one or more physical properties selected from the group consisting of crystallinity of 50% or more, isotacticity (pentad fraction) of 95% or more, an atatic fraction of less than 5%, a density of 0.905 g/cm$^3$ or more, a melting temperature of 164° C. or more, and a crystallization temperature of 125° C. or more.

Furthermore, the present invention provides a multicomponent microporous membrane having a matrix of polypropylene prepared by stretching without using a solvent, wherein a synthetic resin component of the multi-component microporous membrane comprises a) 70 to 99 weight % of polypropylene; and b) 1 to 30 weight % of one or more polymers selected from the group consisting of poly(ethylene-butylene) copolymer, poly(ethylene-hexene) copolymer, poly(ethylene-octene) copolymer, polyethylene prepared by metallocene catalysts, poly(ethylene-vinylacetate) copolymer, poly(styrene-ethylene) copolymer, poly(styrene-butylene-styrene) copolymer, poly(styrene-ethylene-butylene-styrene) copolymer, silane group grafted polyolefin, maleic anhydride or acrylic acid grafted polyolefin, ionomer, and derivatives thereof.

Furthermore, the present invention provides a preparation method of a multicomponent microporous membrane having a matrix of polypropylene prepared by stretching without using a solvent comprising the steps of:
a) mixing synthetic resin raw materials in a ratio of
i) 70 to 99 weight % of polypropylene; and
ii) 1 to 30 weight % of one or more polymers selected from the group consisting of poly(ethylenebutylene) copolymer, poly(ethylene-hexene) copolymer, poly(ethylene-octene) copolymer, polyethylene prepared by metallocene catalysts, poly(ethylene-vinylacetate) copolymer, poly(styrene-ethylene) copolymer, poly(styrene-butylene-styrene) copolymer, poly(styrene-ethylene-butylene-styrene) copolymer, silane group grafted polyolefin, maleic anhydride or acrylic acid grafted polyolefin, ionomer, and derivatives thereof;
b) preparing a precursor film by feeding the mixed material into an extruder;
c) annealing the precursor film at a temperature of polypropylene melting point or less;
d) low temperature stretching the annealed film at a temperature of ordinary temperature or less;
e) high temperature stretching the low temperature stretched film at a temperature of polypropylene melting point or less; and
f) heat setting the high temperature stretched film under tension at a temperature of polypropylene melting point or less.

Furthermore, the present invention provides a battery separator comprising the multi-component microporous membrane.

Furthermore, the present invention provides a lithium ion battery or particularly lithium ion polymer battery using the multi-component microporous membrane as a separator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
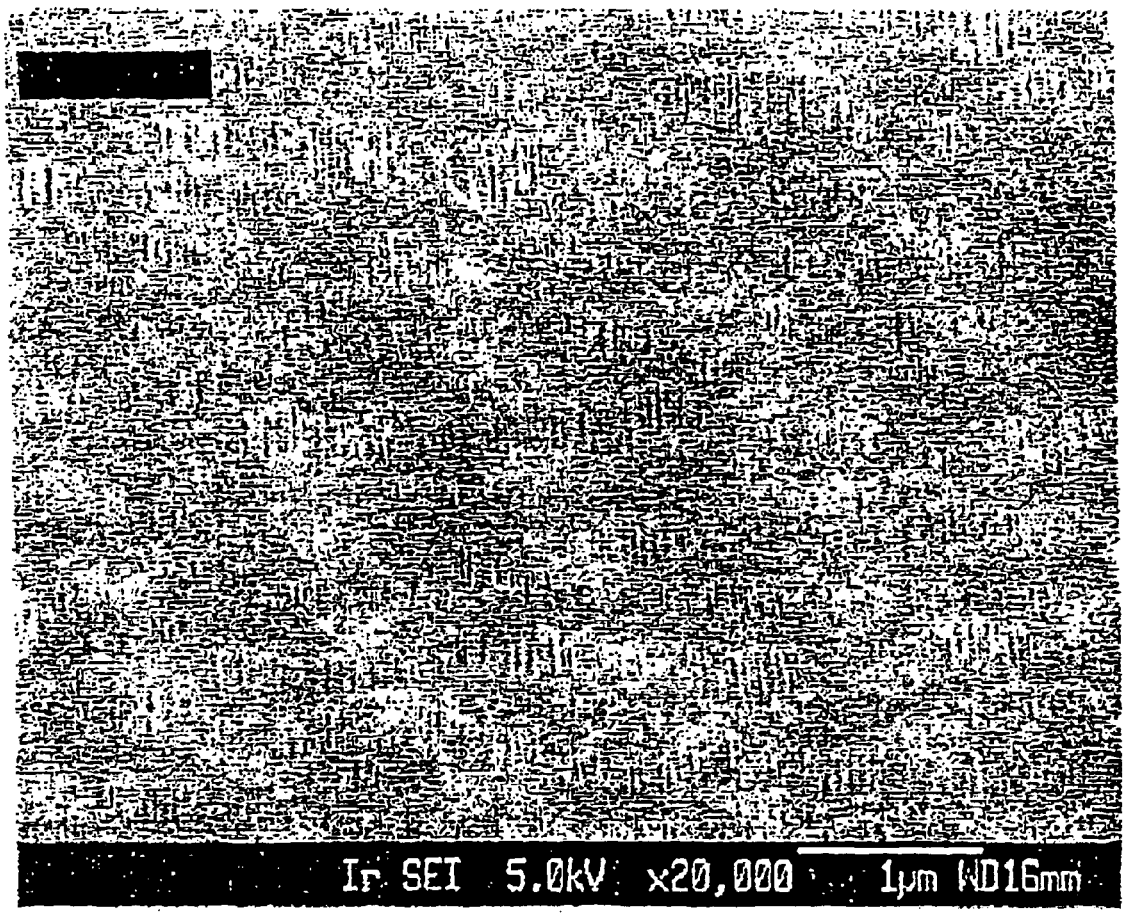
FIG. 1 is a scanning electron microscope (SEM) photograph showing a microporous membrane prepared using high crystalline polypropylene of EXAMPLE 1 of the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention is described in detail as follows.

Although a separator for batteries has not conventionally been prepared using high crystalline polypropylene, the present inventors found that air permeability of a membrane prepared from high crystalline polypropylene was much superior to that of a membrane prepared from general purpose polypropylene, thus they tried to use high crystalline polypropylene in the battery separator field which requires greater air permeability characteristics.

First, after describing in detail high crystalline polypropylene which is used for preparing a microporous membrane of the present invention and a preparation method of a high crystalline polypropylene microporous membrane, a separator for batteries using a microporous membrane of the present invention will be described in detail.

High crystalline polypropylene used in preparing a microporous membrane is high crystalline polypropylene having a crystallinity of about 50% or more (where the density of high crystalline polypropylene is about 0.905 $g/cm^3$ or more), which is different from general purpose polypropylene having a crystallinity of less than 50%. High crystalline polypropylene of the present invention shows high density, melting temperature, and crystallization temperature, and superior mechanical properties such as high rigidity, heat resistance, impact resistance, scratch resistance, dimensional stability, etc. since it has a higher tacticity than general purpose polypropylene.

There are various methods which distinguish general purpose polypropylene from high crystalline polypropylene, and among them a method which classifies based on melting temperature, crystallization temperature, crystallinity, isotacticity, atatic fraction, etc. is representative. Melting temperature and crystallization temperature are measured using a dynamic scanning calorimeter (DSC), wherein general purpose polypropylene has a melting temperature of 160 to 163° C. and a crystallization temperature of 117 to 120° C. while high crystalline polypropylene has a melting temperature of 164° C. or more and a cystallization temperature of 125° C. or more.

Crystallinity, a value in which weight of crystallized area per polymer total weight is represented as a percentage, is measured using a dynamic scanning calorimeter, a x-ray diffractometer (XRD), etc., wherein polypropylene having a crystallinity of about 50% or more is called high crystalline polypropylene. Isotacticity (pentad fraction) of polypropylene is measured by a $C^{13}$ nuclear magnetic resonance method, wherein isotacticity (pentad fraction) of general purpose polypropylene is from 93 to 96% while isotacticity (pentad fraction) of high crystalline polypropylene is about 95% or more.

Furthermore, general purpose polypropylene exhibits an atatic fraction of 5% or more while high crystalline polypropylene of the present invention exhibits an atatic fraction of 5% or less when measuring atatic fractions of polypropylene using xylene.

Therefore, a high crystalline polypropylene microporous membrane satisfying one or more physical properties selected from the group consisting of crystallinity of 50% or more, isotacticity (pentad fraction) of 95% or more, an atatic fraction of less than 5%, a density of 0.905 $g/cm^3$ or more, a melting temperature of 164° C. or more, and a crystallization temperature of 125° C. or more is preferably used in order to prepare a microporous membrane satisfying properties which are required in the present invention. The physical properties of high crystalline polypropylene of the present invention are correlated rather than independent, and particularly crystallinity and isotacticity (pentad fraction) among the physical properties are very important in satisfying physical properties required in a microporous membrane of the present invention. Therefore, the values thereof should be satisfied. Furthermore, an air permeability of a microporous membrane prepared using high crystalline polypropylene of the present invention is preferably 500 sec/100 cc or less in order to improve conductivities of ions such as lithium ions, etc. through the membrane. A separator for lithium ion batteries comprising high crystalline polypropylene of the present invention preferably has a high melt-integrity temperature, preferably 164° C. or more, in order to improve stability of the membrane.

That is, high crystalline polypropylene with the above-described physical properties is preferably used in the present invention, because if these properties are not present, pore uniformity and porosity of the prepared membrane do not become superior. The preparation method of a membrane using a dry process is a method in which pores are formed by rupturing a relatively weak amorphous region through cold stretching after orientating a polymer crystal region toward a certain direction. Therefore, the present inventors have tried to improve permeability characteristics and mechanical properties of a membrane prepared using high crystalline polypropylene by judging that characteristics of a microporous membrane are greatly influenced not only by uniformity and degree of orientation of the polymer crystal region, but also by the crystallinity of the polymer used.

That is, high crystalline polypropylene, instead of general purpose polypropylene having a 50% or less crystallinity, is used in the present invention so that a microporous membrane having an improved degree of orientation and much superior orientation uniformity can be prepared. Therefore, the porous membrane prepared using high crystalline polypropylene has a much more uniform pore size and distribution, and a higher pore density and porosity than a conventional porous membrane, thereby having improved mechanical properties due to improved permeability properties, as well as the high crystallinity of polypropylene.

When a porous membrane prepared using high crystalline polypropylene of the present invention is used as a separator for lithium ion batteries, the separator has superior charging and discharging characteristics, particularly at low temperature, due to superior air permeability thus remarkably improved ion permeability. It also remarkably improves battery safety due to a high melting temperature of high crystalline polypropylene, thus having a high melt-integrity temperature Furthermore, a microporous membrane of the present invention can be prepared by solely using the high crystalline polypropylene, or by laminating or blending high crystalline polypropylene with a compound such as polyolefin having superior physical properties, etc., in order to satisfy physical property requirements of the particular applications.

Furthermore, a high crystalline polypropylene microporous membrane of the present invention, or a microporous membrane prepared by laminating or blending one or more compounds as above, can be used in a separator for lithium ion batteries or particularly a separator for lithium ion polymer batteries due to superior physical properties such as conductivity of ions. Air permeability of the separator for lithium ion batteries prepared using high crystalline polypropylene of the present invention is preferably 500 sec/100 cc or less so that lithium ions can be easily conducted through the membrane.

A multi-component material having a matrix of polypropylene used in preparing a multi-component microporous membrane of the present invention, a preparation method of a multi-component microporous membrane having a matrix of polypropylene, and a separator for batteries using a multicomponent microporous membrane of the present invention are described in detail as follows.

A microporous membrane of the present invention is prepared in a method similar to the conventional dry process after molding a precursor film by blending polypropylene with a small amount of semi-compatible polymer.

When polymers added to polypropylene of the present invention have high compatibilities with the polypropylene, inherent crystalline structure of polypropylene is destroyed thus making formation of pores by a stretching method difficult, and when they have insufficient compatibilities with the polypropylene, it is difficult to prepare a film having a uniform thickness distribution thus making it difficult to expect better mechanical properties since interfacial characteristics between the two components deteriorate. Therefore, it is important to select polymers having appropriate compatibilities.

If these polymers are appropriately selected and melt blended with polypropylene to be well dispersed into the polypropylene, not only are permeabilities improved by facilitating the easy forming of pores in the polypropylene, but mechanical properties are also improved because the polymers function as an impact buffer zone against external impulsion.

Polymers added to polypropylene of the present invention are mostly polyolefin of which typical examples are poly(ethylene-butylene) copolymer, poly(ethylene-hexene) copolymer, poly(ethylene-octene) copolymer, polyethylene prepared by metallocene catalysts, poly(ethylene-vinylacetate) copolymer, poly(styrene-ethylene) copolymer, poly(styrene-butylene-styrene) copolymer, poly(styrene-ethylene-butylene-styrene) copolymer, silane group grafted polyolefin, maleic anhydride or acrylic acid grafted polyolefin, ionomer, and derivatives thereof, and a microporous membrane is prepared by selecting one or more polymers among them and melt blending them together with polypropylene.

Polyethylene prepared by metallocene catalysts having a small difference of molecular weight distribution is suitable for objects of the present invention. Because of comonomers added along with ethylene and the difference of molecular weight distribution, polyethylene prepared by general Ziegler-Natta catalysts rather than by metallocene catalysts does not have good interfacial characteristics with polypropylene, thereby making it difficult to obtain high mechanical properties. Therefore, it is not suitable in the present invention.

On the other hand, the various copolymers can have a random or block structure depending on the polymerization methods, wherein both structures can be applied, and particularly the block structure is more preferable.

The polymers added are preferably added to a total composition in an amount of 1 to 30 weight % and blended. It is difficult to expect that their permeabilities improve even though their physical properties increase when their contents are 30 weight % or more.

Although general polypropylene having a number average molecular weight of 10,000 or more can be used as a matrix in a microporous membrane of the present invention, use of high crystalline polypropylene having a higher tacticity than general purpose polypropylene can obtain greater effects.

Polypropylene can be classified into high crystalline polypropylene if it satisfies at least one or more physical properties selected from the group consisting of a number average molecular weight of 10,000 or more, a density of 0.905 g/cc or more, a melting temperature of 164° C. or more, a crystallization temperature of 125° C. or more, crystallinity of 50% or more, an isotacticity (pentad fraction) of 95% or more, and an atatic fraction of less than 5%.

Furthermore, the polypropylene can be one or more polypropylenes selected from the group consisting of high crystalline polypropylenes each having a different number average molecular weight, weight average molecular weight, or molecular weight distribution, and general purpose polypropylene.

A microporous membrane is prepared by processing the above described precursor film prepared by multi-component blending in a dry process in the present invention. Particularly when the microporous membrane is used as a separator for lithium ion batteries, battery performances are improved due to improved permeability and mechanical properties.

Furthermore, high permeability and mechanical properties can provide more superior battery characteristics when the microporous membrane is used as a part of a laminated membrane in lithium ion batteries, and it can provide superior battery characteristics when the microporous membrane is used as a separator in lithium ion polymer batteries in which gel phase polymer electrolyte is used. For example, a lithium ion polymer battery is manufactured by coating gel phase polymer electrolyte on both sides of a microporous membrane of the present invention, wherein suspect permeability and mechanical properties of polymer electrolyte can be complemented by superior permeability and mechanical properties of the present invention.

Furthermore, a microporous membrane of the present invention corresponds with varieties of lithium ion battery characteristics in the case of 500 sec/100 cc or less of air permeability, A preparation method of a microporous membrane by a dry process using high crystalline polypropylene of the present invention is described in the following.

(1) Preparing of Precursor Film:

A precursor film is prepared solely from high crystalline polypropylene of the present invention or high crystalline polypropylene contained polyolefin using an extruder with a T-die or tubular die attached in an ordinary method. Although extrusion conditions can be varied depending on compounds used in preparing a microporous membrane, it is preferable that a extrusion temperature is from 150 to 300° C., a temperature of a cooling roll is from 0 to 150° C., and a taking-up speed is from 5 to 100 m/min.

(2) Annealing of Film:

The prepared precursor film is annealed in a dry oven at a temperature of below the melting point of polyolefin in order to raise crystallinity and the ratio of elastic restitution. The annealing is preferably carried out at a temperature of below the melting point of the polyolefin used for 30 seconds to 1 hour, since a melting point of general polyolefin is lower than that of high crystalline polypropylene.

(3) Low Temperature Stretching:

Microcracks are formed by mono-axially stretching or bi-axially stretching the annealed film using a roll or other different stretching machine at a temperature of below the ordinary temperature. A stretching ratio of low temperature stretching is preferably from 10 to 150% although it can be changed depending on the formation degree of microscopic pores.

(4) High Temperature Stretching

Microscopic pores having desirable sizes are formed and mechanical properties are provided to a membrane prepared by mono-axially or bi-axially stretching the low temperature stretched film using a roll or other different stretching machines at a temperature of below the melting point of the polymer. Although the high temperature stretching conditions can be varied depending on raw materials of the membrane, it is preferable that a temperature of high temperature stretching is from 100 to 200° C., and a stretching ratio is from 30 to 200%.

(5) Heat Setting

Microscopic pores formed by heat setting the high temperature stretched film under the state in which tensions are received for a certain duration of time at a temperature of below the melting point of a polymer for preparing a film are stabilized. The heat setting is preferably performed at a temperature similar to that of high temperature stretching, for about 1 minute to 1 hour.

The steps used in the preparation method of a microporous membrane of the present invention describe overall processes for preparing a membrane having optimum physical properties, wherein the membrane can be prepared not only by skipping some of the steps or adding processes depending on the physical property requirements of the membrane, but also by changing an order of each of the steps.

Physical properties such as air permeability, porosity, pore size, shut-down temperature, melt-integrity temperature, etc. are measured on the microporous membrane prepared in the above method.

Since a microporous membrane prepared by the present invention exhibits a much more uniform pore size distribution, higher pore density and ski porosity compared to a membrane prepared of conventional general purpose polypropylene, thereby having improved permeability and superior mechanical properties, it can be used as a separator for batteries when it is extruded to a certain thickness. Particularly, when a separator for lithium ion polymer batteries is prepared using a microporous membrane of the present invention, the separator is prepared by coating gel phase polymer electrolyte on both sides of a microporous membrane of the present invention which is prepared to a certain thickness in an ordinary method. Polymer electrolyte which is used in preparing the separator for lithium ion polymer batteries is one or more materials selected from the group consisting of polyvinylidene fluoride (PVDF), polyvinylidene fluoride chlorotrifluoroethylene, polyvinylidene fluoride hexafluoropropylene copolymer, polyethylene oxide, polypropylene oxide, polyurethane, polyacrylonitrile, polymethylacrylate, polyacrylamide, polyvinylacetate, polyvinylpyrrolidone, polytetraethylene glycol diacrylate, and copolymers or derivatives thereof.

Furthermore, a preparation method of a microporous membrane comprises the steps of:

a) mixing: polypropylene or other added polymers are dry blended with a tumble blender or melt blended with an extruder, etc.

b) preparing a precursor film: a precursor film is prepared by extruding the blended mixture with an extruder to which a T-die, or tubular die is attached.

c) annealing: the prepared precursor film is annealed at a temperature of below the melting point of polypropylene in a dry oven in order to raise the crystallinity and ratio of elastic restitution.

d) low temperature stretching: microcracks are formed on the annealed film by stretching the film at an ordinary temperature or less using a roll or other different stretching machines.

e) high temperature stretching: microscopic pores having desirable sizes are formed by stretching the microcracks which are produced by the low temperature stretching, etc. using a roll or other different stretching machines at a temperature of polypropylene melting point or less, and mechanical properties are provided to the membrane.

f) heat setting: the high temperature stretched film is heat set under the state in which tensions are received at a temperature of polypropylene melting point or less for a certain duration of time.

The above steps describe the preparation of a microporous membrane having optimum physical properties, wherein some steps can be skipped, or additional processes can be added depending on the desired final physical properties, and the order of some of the steps can be changed.

The present invention is explained more in detail by the following EXAMPLES and COMPARATIVE EXAMPLES. However, EXAMPLES are only for exemplifying the present invention, and not for limiting the present invention.

EXAMPLES

Microporous membranes prepared by the following EXAMPLES and COMPARATIVE EXAMPLES were evaluated for the following characteristics:

a) thickness;

b) pore size: scanning electron microscope (SEM), transmission electron microscope (TEM);

c) porosity: American Society for Testing and Materials (ASTM) D2873;

d) air permeability: Japanese Industrial Standard (JIS) P8117;

e) tensile strength, tensile modulus, and elongation at break:
American Society for Testing and Materials (ASTM) D882;

f) puncture resistance; and g) melt-integrity temperature

Example 1—1

Preparing of a Microporous Membrane Using High Crystalline Polypropylene

High crystalline polypropylene having a melt index of 2.0 g/10 min, a density of 0.91 g/cc, a melting temperature of 167° C. measured using a dynamic scanning calorimeter, a crystallization temperature of 135° C., a crystallinity of 58%, isotacticity (pentad fraction) of 98.5% measured by $C^{13}$ nuclear magnetic resonance, and an atatic fraction of about 2% measured after being dissolved with xylene was used as a raw material of a microporous membrane. A precursor film was prepared from the high crystalline polypropylene using a single screw extruder with a T-die having an extruding temperature of 220° C. attached, and a take-up device having a cooling roll temperature of 70° C. and a taking-up speed of 50 m/min, wherein the draw down rate of the prepared precursor film was 70. The prepared precursor film was annealed in a dry oven at a temperature of 160° C. for 1 hour. The annealed film was mono-axially stretched to 50% of the stretching ratio based on the initial length at the ordinary temperature using a roll stretching method. The ordinary temperature stretched film was high temperature mono-axially stretched to 100% of the stretching ratio at a temperature of 140° C. using a roll stretching method, heat set under the state in which tensions were received at a temperature of 140° C. for about 10 minutes, and then cooled, thereby preparing a microporous membrane. Physical properties of the obtained microporous membrane were measured so and the results are represented in the following Table 1, and the result of a scanning electron microscope photograph of a microporous membrane is represented in FIG. 1.

As can be seen in Table 1, it is found that air permeability and porosity of a membrane prepared using high crystalline polypropylene of EXAMPLE 1—1 were remarkably improved compared with a membrane of COMPARATIVE EXAMPLE 1—1 prepared using general purpose polypropylene, and melt-integrity temperature, considered to be important when used as a separator for batteries, was shown to be high. Furthermore, as can be seen in scanning electron microscope photographs of FIG. 1 and FIG. 2, a microporous membrane prepared using high crystalline polypropylene of the present invention showed remarkably high uniformity of membrane pore size and pore density as compared with a microporous membrane prepared using general purpose polypropylene.

Example 1–2

Preparing of a Microporous Membrane Comprised by Laminating High Crystalline Polypropylene and Polyethylene The same high crystalline polypropylene and high density polyethylene as used in the EXAMPLE 1—1 were used as raw materials of a precursor film. The high density polyethylene had a melt index of 0.3 g/10 min and a density of 0.964 g/cc. A precursor film was prepared using the same extruder, T-die, and take-up device as in the EXAMPLE 1—1, wherein an extruding temperature was 210° C., a cooling roll temperature of a take-up device was 80° C., a taking-up speed was 50 m/min, and a draw down rate of the prepared precursor film was 70 in the case of polyethylene. Each thickness of the prepared high crystalline polypropylene and high density polyethylene precursor films was 10 μm. The two prepared precursor films were laminated in the order of polypropylene, high density polyethylene, and polypropylene at a high temperature using a press having a temperature of 130° C. and pressure of 50 kg/cm². The laminated precursor film was annealed in the same dry oven as in the EXAMPLE 1—1 at a temperature of 125° C. for 1 hour. The annealed film was monoaxially stretched to 50% of the stretching ratio at the ordinary temperature, and the ordinary temperature stretched film was high temperature mono-axially stretched to 100% of the stretching ratio at a temperature of 125° C. in the same method as in the EXAMPLE 1—1. And then, the film was heat set under the state in which tensions were received at a temperature of 125° C. for about 10 minutes, and then cooled, thereby preparing a microporous membrane. Physical properties of the obtained microporous membrane were measured, and the results are represented in the following Table 1.

As can be seen in Table 1, it is found that air permeability and porosity of a laminated membrane prepared in the EXAMPLE 1–2 were superior than a membrane prepared from general purpose polypropylene of COMPARATIVE EXAMPLE 1—1, and particularly, the melt-integrity temperature determined by polypropylene was shown to be high resulting in advantages in battery safety aspects.

Example 1–3

Preparing of a Microporous Membrane Comprised by Blending High Crystalline Polypropylene and Polyethylene The same high crystalline polypropylene and high density polyethylene as used in the EXAMPLE 1—1 and EXAMPLE 1–2 were used as raw materials of a precursor film after blending polypropylene and high density polyethylene, in a composition ratio of 70 weight % and 30 weight %, respectively. A precursor film was prepared using the same extruder, T-die, and take-up device as in the EXAMPLE 1—1, wherein an extruding temperature was 210° C., a cooling roll temperature of a take-up device was 80° C., a taking-up speed was 50 m/min, and draw down rate of the prepared precursor film was 70. The obtained precursor film was annealed in the same dry oven as in the EXAMPLE 1–2 at a temperature of 125° C. for 1 hour. The annealed film was mono-axially stretched to 50% of the stretching ratio at the ordinary temperature, and the ordinary temperature stretched film was high temperature mono-axially stretched to 100%, of the stretching ratio at a temperature of 125° C., in the same method as in the EXAMPLE 1—1. And then, the film was heat set under the state in which tensions were are received at a temperature of 125° C. for about 10 minutes, and then cooled, thereby preparing a microporous membrane. Physical properties of the obtained microporous membrane were measured, and the results are represented in the following Table 1.

It is found that air permeability and porosity of a membrane prepared in the EXAMPLE 1–3 were also superior to a membrane prepared in COMPARATIVE EXAMPLE 1—1, and the melt-integrity temperature was shown to be a similar high value to that of a membrane comprised of a laminate of the EXAMPLE 1–2, resulting in advantages in battery safety aspects.

Comparative Example 1—1

Preparing of a Microporous Membrane Using General Purpose Polypropylene

Figure 2:
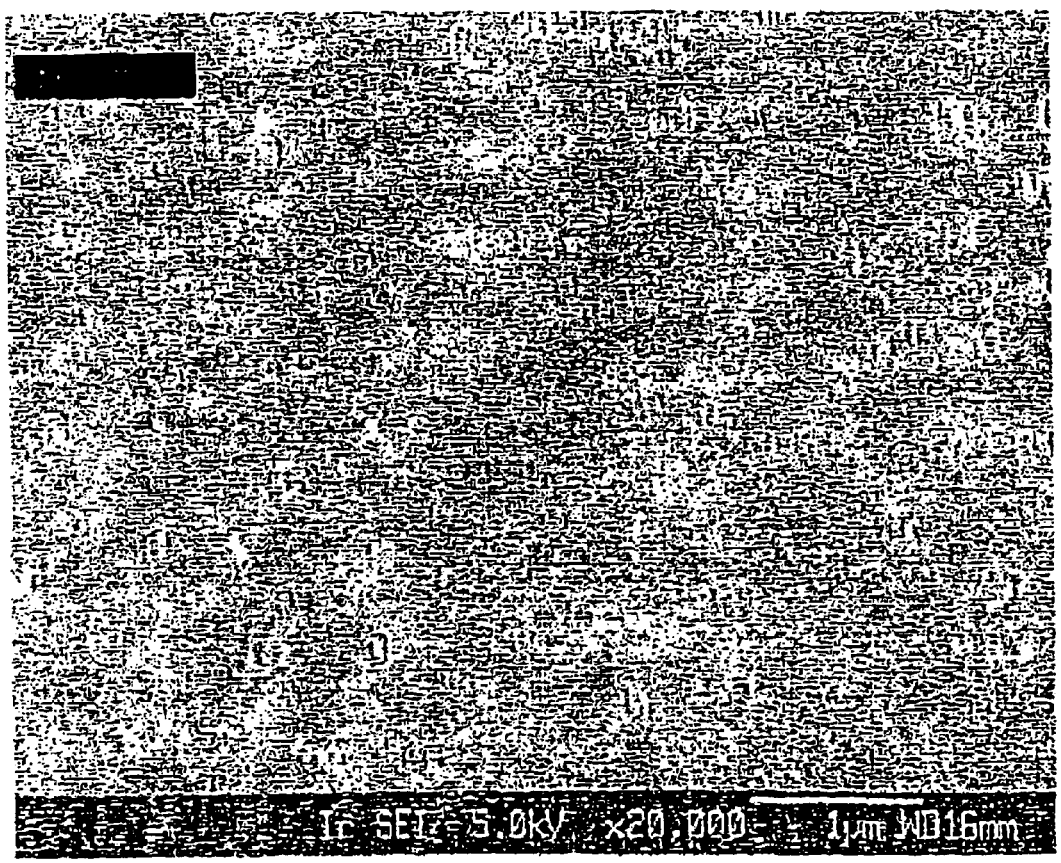
FIG. 2 is a scanning electron microscope photograph showing a microporous membrane prepared using general polypropylene of COMPARATIVE EXAMPLE 1 of the present invention.

A microporous membrane was prepared in the same method and conditions as in the EXAMPLE 1—1 using general purpose polypropylene having a melt index of 2.0 g/10 min, a density of 0.90 g/cc, a melting temperature of 162° C. measured using a dynamic scanning calorimeter, a crystallization temperature 119° C., 48% of crystallinity, isotacticity (pentad fraction) of 94% measured by $C^{13}$ nuclear magnetic resonance, and an atatic fraction of about 6% of measured after being dissolved with xylene. Physical properties of the obtained microporous membrane were measured, and the results are represented in the following Table 1, and the result of a scanning electron microscope photograph of a microporous membrane is represented in FIG. 2.

Example 2–1

After preparing a precursor film using high crystalline polypropylene as a matrix and poly(ethylene-butylene) copolymer as an added polymer, a microporous membrane was prepared by stretching the precursor film in a dry process.

(Mixing)

90 weight % of high crystalline copolymer having a melt index of 2.0 g/10 min, a density of 0.91 g/cc, a melting temperature measured by a dynamic scanning calorimeter (DSC) of 167° C., a crystallization temperature of 135° C., and crystallinity of 58%, and 10 weight % of poly(ethylene-butylene) copolymer having a melt index of 2.5 g/10 min and a density of 0.9 g/cc were dry blended using a tumble blender.

(Preparing of a Precursor Film)

A precursor film was prepared from the blended mixture using a single screw extruder with a T-die attached and a take-up device. The extrusion temperature was 200° C., cooling roll temperature of the take-up device was 60° C., taking-up speed was 20 m/min, and draw down rate (DDR) was 90.

(Annealing)

The prepared precursor film was annealed at a temperature of 160° C. for 1 hour in a dry oven.

(Low Temperature Stretching)

After annealing, the annealed film was monoaxially stretched to 50% of the stretching ratio based on an initial length at the ordinary temperature using a roll stretching method.

(High Temperature Stretching)

After low temperature stretching, the low temperature stretched film was mono-axially high temperature stretched to 100% of the stretching ratio at a temperature of 140° C. using a roll stretching method.

(Heat Setting)

After high temperature stretching, the high temperature stretched film was heat set under the state in which tensions were received at a temperature of 140° C. for 10 minutes and then cooled, thereby preparing a microporous membrane.

Various physical properties of the prepared microporous membrane are represented in the following Table 2.

As can be seen from the following Table 2, it can be found that air permeability and mechanical properties of a microporous membrane prepared using a multi-component blend were remarkably improved compared with the microporous membranes prepared using a single component of polypropylene in COMPARATIVE EXAMPLES 2–1 and 2—2, and the melt-integrity temperature, particularly important when used as a separator for batteries, was greatly increased compared with COMPARATIVE EXAMPLE 2–1. Furthermore, physical properties such as puncture resistance, etc. were greatly improved.

Example 2—2

A microporous membrane was prepared in the same method as in the EXAMPLE 2–1 except that a precursor film was prepared using high crystalline polypropylene used in the EXAMPLE 2–1 as a matrix, and by adding polyethylene which was prepared using metallocene catalysts, as an added polymer. Polyethylene prepared using metallocene catalysts had a melt index of 1.0 g/10 min and density of 0.935 g/cc. Various physical properties of the prepared microporous membrane are represented in the following Table 2.

As can be seen in the following Table 2, it can be found that air permeability, mechanical properties, and melt-integrity temperature of the prepared microporous membrane were superior, and tensile modulus in particular was greatly improved. That seems to be caused by inherent characteristics of polyethylene prepared using metallocene catalysts.

Example 2–3

A microporous membrane was prepared in the same method as in the EXAMPLE 2–1 except that a precursor film was prepared using high crystalline polypropylene used in the EXAMPLE 2–1 as a matrix, and by adding poly (ethylene-butylene) copolymer used in EXAMPLE 2–1 and polyethylene which was prepared using metallocene catalysts used in EXAMPLE 2—2 as added polymers. Composition blend ratios of the precursor were 90 weight % of high crystalline polypropylene, 5 weight % of poly(ethylene-butylene) copolymer, and 5 weight % of polyethylene, prepared using metallocene catalysts. Various physical properties of the prepared microporous membrane are represented in the following Table 2.

As can be seen in the following Table 2, it can be found that air permeability, mechanical properties, and melt-integrity temperature of the prepared microporous membrane were superior.

Example 2–4

A microporous membrane was prepared in the same method as in the EXAMPLE 2–1 except that a precursor film was prepared using high crystalline polypropylene used in the EXAMPLE 2–1 as a matrix and by adding poly(styrene-butylene-styrene) copolymer as an added polymer. The styrene fraction within poly(styrene-butylene-styrene) copolymer was 70 weight %. Various physical properties of the prepared microporous membrane are represented in the following Table 2.

As can be seen in the following Table 2, it can be found that air permeability, mechanical properties, and melt-integrity temperature of the prepared microporous membrane were superior, and tensile strength in particular was improved.

Comparative Example 2–1

A microporous membrane was prepared in the same method as the EXAMPLE 2–1 except that a precursor film was prepared using only general purpose polypropylene as a matrix without adding any secondary polymers. The general purpose polypropylene used had a melt index of 2.0 g/10 min, a density of 0.9 g/cc, a melting temperature measured by a dynamic scanning calorimeter (DSC) of 162° C., a crystallization temperature of 119° C., and crystallinity of 48%. Various physical properties of the prepared microporous membrane are represented in the following Table 2.

Comparative Example 2—2

A microporous membrane was prepared in the same method as the EXAMPLE 2–1 except that a precursor film was prepared solely using high crystalline polypropylene used in the EXAMPLE 2–1 as a matrix without adding any secondary polymers. Various physical properties of the prepared microporous membrane are represented in the following Table 2.

TABLE 1

| Classification | EXAMPLE 1-1 | EXAMPLE 1-2 | EXAMPLE 1-3 | COMPARATIVE EXAMPLE 1-1 |
|---|---|---|---|---|
| Thickness ($\mu$m) | 25 | 25 | 25 | 25 |
| Pore size (pore diameter: $\mu$m) | 0.3 × 0.1 | 0.3 × 0.1 | 0.3 × 0.1 | 0.2 × 0.1 |
| Porosity (%) | 48 | 42 | 44 | 37 |
| Air permeability (sec/100 cc) | 250 | 380 | 310 | 530 |
| Shut-down temperature (° C.) | 165 | 135 | 134 | 160 |
| Melt-integrity temperature (° C.) | 168 | 168 | 168 | 162 |

TABLE 2

| Classification | EXAMPLE 2-1 | EXAMPLE 2-2 | EXAMPLE 2-3 | EXAMPLE 2-4 | COM. EXAMPLE 2-1 | COM. EXAMPLE 2-2 |
|---|---|---|---|---|---|---|
| Thickness ($\mu$m) | 20 | 20 | 20 | 20 | 20 | 20 |
| Air permeability (sec/100 cc) | 140 | 160 | 155 | 165 | 460 | 200 |
| Tensile strength (kgf/cm$^2$) | 1200 | 1050 | 1120 | 1100 | 580 | 750 |
| Tensile modulus (kgf/cm$^2$) | 4900 | 6400 | 5700 | 5900 | 2300 | 3000 |
| Elongation at break (%) | 55 | 45 | 50 | 50 | 40 | 35 |
| Puncture resistance (g) | 220 | 150 | 185 | 160 | 105 | 120 |
| Melt-integrity temperature (° C.) | 168 | 168 | 168 | 168 | 162 | 168 |

Since a microporous membrane prepared by a preparation method of a high crystalline polypropylene microporous membrane of the present invention has much more uniform pore size distribution, and high pore density and porosity, it can be used as a separator for batteries, particularly a separator for lithium ion batteries, or more particularly a separator for lithium ion polymer batteries, and it has superior permeability and mechanical properties.

Furthermore, a multi-component microporous membrane of the present invention has superior permeability and mechanical properties as compared to a conventional microporous membrane comprising a single component of polypropylene. Furthermore, battery performances are improved due to improved permeability and mechanical properties when a multi-component microporous membrane of the present invention is used as a battery separator of a lithium ion battery, etc. When high crystalline polypropylene is used as a matrix, charging and discharging characteristics, particularly charging and discharging characteristics at a low temperature, are improved due to remarkably improved permeabilities, and melt-integrity temperatures are increased due to a high melting temperature thereby providing big merits in battery safety aspects.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A high crystalline polypropylene microporous membrane having a crystallinity of 50% or more, isotacticity (pentad fraction) of 95% or more, an atactic fraction of less than 5%, a density of 0.905 g/cm$^3$ or more, a melting temperature of 164° C. or more, and a crystallization temperature of 125° C. or more.

2. The high crystalline polypropylene microporous membrane according to claim 1 having 500 sec/100 cc or less of air permeability.

3. A preparation method of a microporous membrane comprising the steps of:

a) preparing a high crystalline polypropylene precursor film having crystallinity of 50% or more, isotacticity (pentad fraction) of 95% or more, an atactic fraction of less than 5%, a density of 0.905 g/cm$^3$ more, a melting temperature of 164° C. or more, and a crystallization temperature of 125° C. or more;

b) annealing the precursor film;

c) stretching the annealed precursor film at a low temperature;

d) stretching the low temperature stretched film at a high temperature; and e) heat setting the high temperature stretched film.

4. A high crystalline polypropylene separator for a lithium ion battery having crystallinity of 50% or more, isotacticity (pentad fraction) of 95% or more, an atactic fraction of less than 5%, a density of 0.905 g/cm$^3$ or more, a melting temperature of 164° C. or more, and a crystallization temperature of 125° C. or more.

5. The high crystalline polypropylene separator for a lithium ion battery according to claim 4 having an air permeability of 500 sec/100 cc or less.

6. The high crystalline polypropylene separator for a lithium ion battery according to claim 4 having a melt-integrity temperature of 164° C. or more.

7. A high crystalline polypropylene separator for a lithium ion polymer battery having crystallinity of 50% or more, isotacticity (pentad fraction) of 95% or more, an atactic fraction of less than 5%, a density of 0.905 g/cm$^3$ or more, a melting temperature of 164° C. or more, and a crystallization temperature of 125° C. or more.

8. A lithium ion polymer battery assembly comprising the high crystalline polypropylene separator according to claim 7 and gel phase polymer electrolyte coated on both sides of the separator.

9. The high crystalline polypropylene separator for a lithium ion polymer battery according to claim 7 having an air permeability of 500 sec/100 cc or less.

10. The high crystalline polypropylene separator for a lithium ion polymer battery according to claim 7 having a melt-integrity temperature of 164° C. or more.

11. The high crystalline polypropylene separator for a lithium ion polymer battery according to claim 8, wherein the gel phase polymer electrolyte is one or more materials selected from the group consisting of polyvinylidene fluoride, polyvinylidene fluoride chlorotrifluoroethylene, polyvinylidene fluoride hexafluoropropylene copolymer, polyethylene oxide, polypropylene oxide, polyurethane, polyacrylonitrile, polymethylacrylate, polyacrylamide, polyvinylacetate, polyvinylpyrrolidone, polytetraethylene glycol diacrylate, and copolymers or derivatives thereof.

12. A multi-component microporous membrane having a matrix of polypropylene prepared by stretching without using a solvent, wherein a synthetic resin component of the multi-component microporous membrane comprises a) 70 to 99 weight % of polypropylene; and b) 1 to 30 weight % of one or more polymers selected from the group consisting of poly(ethylene-butylene) copolymer, poly(ethylene-hexene) copolymer, poly(ethylene-octene) copolymer, polyethylene prepared by metallocene catalysts, poly(ethylene-vinylacetate) copolymer, poly(styrene-ethylene) copolymer, poly(styrene-butylene-styrene) copolymer, poly(styrene-ethylenebutylene-styrene) copolymer, silane group grafted polyolefin, maleic anhydride or acrylic acid grafted polyolefin, ionomer, and derivatives thereof.

13. The multi-component microporous membrane according to claim 12, wherein a) polypropylene is high crystalline polypropylene which has a number average molecular weight of 10,000 or more, and satisfies one or more physical properties selected from the group consisting of a density of 0.905 g/cm$^3$ or more, a melting temperature of 164° C. or more, a crystallization temperature of 125° C. or more, crystallinity of 50% or more, isotacticity (pentad fraction) of 95% or more, and an atactic fraction of less than 5%.

14. The multi-component microporous membrane according to claim 12, wherein a) polypropylene is a blend of one or more polypropylenes selected from the group consisting of high crystalline polypropylenes each having a different number average molecular weight, weight average molecular weight or molecular weight distribution, and general purpose polypropylene.

15. The multi-component microporous membrane according to claim 12 having an air permeability 500 sec/100 cc or less.

16. The multi-component microporous membrane according to claim 12 having a melt-integrity temperature of 163° C. or more.

17. A battery separator comprising the multi-component microporous membrane of claim 12.

18. A lithium ion battery or a lithium ion polymer battery using the multi-component microporous membrane of claim 12 as a separator.

19. A preparation method of a multi-component microporous membrane having a matrix of polypropylene prepared by stretching without using a solvent, comprising the steps of:
a) mixing synthetic resin raw materials in a ratio of
    i) 70 to 99 weight % of polypropylene; and
    ii) 1 to 30 weight % of one or more polymers selected from the group consisting of poly(ethylene-butylene) copolymer, poly(ethylene-hexene) copolymer, poly(ethylene-octene) copolymer, polyethylene prepared by metallocene catalysts, poly(ethylene-vinylacetate) copolymer, poly(styrene-ethylene) copolymer, poly(styrene-butylene-styrene) copolymer, poly(styrene-ethylene-butylene-styrene) copolymer, silane group grafted polyolefin, maleic anhydride or acrylic acid grafted polyolefin, ionomer, and derivatives thereof;
b) preparing a precursor film by feeding the mixed material into an extruder;
c) annealing the precursor film at a temperature of polypropylene melting point or less;
d) low temperature stretching the annealed film at an ordinary temperature or less;
e) high temperature stretching the low temperature stretched film at a temperature of polypropylene melting point or less; and
f) heat setting the high temperature stretched film under tension at a temperature of polypropylene melting point or less.

20. The preparation method of a multi-component microporous membrane according to claim 19, wherein i) polypropylene of the step a) is high crystalline polypropylene which has a number average molecular weight of 10,000 or more, and satisfies one or more physical properties selected from the group consisting of a density of 0.905 g/cm$^3$ or more, a melting temperature of 164° C. or more, a crystallization temperature of 125° C. or more, crystallinity of 50% or more, isotacticity (pentad fraction) of 95% or more, and an atactic fraction of less than 5%.

21. The preparation method of a multi-component microporous membrane according to claim 19, wherein polypropylene of the step a) is a blend of one or more polypropylenes selected from the group consisting of high crystalline polypropylenes each having a different number average molecular weight, weight average molecular weight or molecular weight distribution, and general purpose polypropylene.

22. A high crystalline polypropylene microporous membrane satisfying one or more physical properties selected from the group consisting of a crystallinity of 50% or more, isotacticity (pentad fraction) of 95% or more, an atactic fraction of less than 5%, a density of 0.905 g/cm$^3$ or more, a melting temperature of 164° C. or more, and a crystallization temperature of 125° C. or more; having an air permeability of 500 sec/100 cc or less.

23. A high crystalline polypropylene separator for a lithium ion battery satisfying one or more physical properties selected from the group consisting of a crystallinity of 50% or more, isotacticity (pentad fraction) of 95% or more, an atactic fraction of less than 5%, a density of 0.905 g/cm$^3$ more, a melting temperature of 164° C. or more, and a crystallization temperature 125° C. or more; having an air permeability of 500 sec/100 cc or less.

24. The high crystalline polypropylene separator for a lithium ion battery according to claim 23 having a melt-integrity temperature of 164° C. or more.

25. A high crystalline polypropylene separator for a lithium ion polymer battery satisfying one or more physical properties selected from the group consisting of a crystallinity of 50% or more, isotacticity (pentad fraction) of 95% or more, an atactic fraction of less than 5%, a density of 0.905 g/cm$^3$ or more, a melting temperature of 164° C. or more, and a crystallization temperature of 125° C. or more; having an air permeability of 500 sec/100 cc or less.

26. The high crystalline polypropylene separator for a lithium ion polymer battery according to claim 25 having a melt-integrity temperature of 164° C. or more.

* * * * *